(12) United States Patent
Dezonno et al.

(10) Patent No.: US 7,010,115 B2
(45) Date of Patent: Mar. 7, 2006

(54) SYSTEM AND METHOD FOR PREDICTIVE CONTACTS

(75) Inventors: Anthony J. Dezonno, Bloomingdale, IL (US); William Fechalos, Naperville, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 419 days.

(21) Appl. No.: 10/078,049

(22) Filed: Feb. 19, 2002

(65) Prior Publication Data

US 2003/0156704 A1 Aug. 21, 2003

Related U.S. Application Data

(60) Provisional application No. 60/367,374, filed on Dec. 13, 2001.

(51) Int. Cl.
*H04M 3/00* (2006.01)
*H04M 5/00* (2006.01)

(52) U.S. Cl. .............................. 379/265.09; 379/265.1; 379/266.07

(58) Field of Classification Search ........... 379/265.02, 379/265.1, 265.11, 266.07, 266.08, 265.09
See application file for complete search history.

(56) References Cited

U.S. PATENT DOCUMENTS

| | | | |
|---|---|---|---|
| 4,881,261 A | 11/1989 | Oliphant et al. | ............ 379/215 |
| 5,341,412 A | 8/1994 | Ramot et al. | .................. 379/92 |
| 5,546,456 A | 8/1996 | Vilsoet et al. | .............. 379/265 |
| 5,815,566 A * | 9/1998 | Ramot et al. | .......... 379/210.01 |
| 5,822,400 A | 10/1998 | Smith | ........................... 379/34 |
| 5,828,839 A | 10/1998 | Moncreiff | .............. 395/200.34 |
| 5,911,134 A | 6/1999 | Castonguay et al. | ........... 705/9 |
| 6,128,646 A | 10/2000 | Miloslavsky | ................ 709/206 |
| 6,130,933 A | 10/2000 | Miloslavsky | ............. 379/90.01 |
| 6,198,814 B1 | 3/2001 | Gill | ............................ 379/266 |
| 6,212,178 B1 | 4/2001 | Beck et al. | ................. 370/352 |
| 6,230,197 B1 | 5/2001 | Beck et al. | ................. 709/223 |
| 6,278,777 B1 * | 8/2001 | Morley et al. | ......... 379/265.02 |
| 6,311,231 B1 * | 10/2001 | Bateman et al. | ....... 379/265.09 |
| 6,567,848 B1 * | 5/2003 | Kusuda et al. | ............ 709/219 |
| 6,614,903 B1 * | 9/2003 | Flockhart et al. | ...... 379/265.12 |
| 6,694,009 B1 * | 2/2004 | Anderson et al. | ...... 379/266.06 |
| 2001/0043586 A1 | 11/2001 | Miloslavsky | ................ 370/352 |
| 2004/0249650 A1 * | 12/2004 | Freedman et al. | ............. 705/1 |

FOREIGN PATENT DOCUMENTS

WO  WO 01/80540  10/2001

* cited by examiner

*Primary Examiner*—Benny Q. Tieu
(74) *Attorney, Agent, or Firm*—Welsh & Katz

(57) ABSTRACT

Disclosed is a method for distributing customer contacts to a transaction processing entity of a transaction processing system. The method includes predicting a time for assignment of a customer contact to a transaction processing entity in the transaction processing system. In an alternative embodiment, the method also includes finding a transaction processing entity that is available to process the customer contact and routing the customer contact to the found transaction processing entity. It is emphasized that this abstract is provided to comply with the rules requiring an abstract that may allow a searcher or other reader to quickly ascertain the subject matter of the technical disclosure. It is submitted with the understanding that it will not be used to interpret or limit the scope or meaning of the claims.

45 Claims, 1 Drawing Sheet

SYSTEM AND METHOD FOR PREDICTIVE CONTACTS

CROSS REFERENCE TO RELATED APPLICATIONS

The present application claims the benefit of U.S. Provisional Patent Application Ser. No. 60/367,374 entitled SYSTEM AND METHOD FOR PREDICTIVE CUSTOMER CONTACTS filed on Dec. 13, 2001.

BACKGROUND OF THE INVENTION

This invention relates generally to communication systems and, more particularly, to transaction processing systems.

Communications systems with customer contact centers are known. Such systems are typically used as a means of distributing customer contacts, such as telephone calls, among a group of agents of an organization. As customer contacts are made with customers utilizing a communications network, such as a public switched telephone network (PSTN), the communications system directs the customer contacts to its agents based upon some algorithm. For example, a communications system such as an automatic call distributor (ACD), a private branch exchange (PBX), or a central office exchange service (Centrex) may recognize a call target based upon an identity of an incoming trunk line and route the call accordingly.

Businesses, service organizations, and other entities may use customer contact centers to process telephone calls, email messages and voice mail contacts for marketing, sales, product support, and other customer service functions. Agents of the customer contact center may communicate with a customer to handle inquiries, process billing orders, and perform research. In essence, the agents provide the wide array of services that the companies that use them require. Thus, the effectiveness and efficiency of a customer contact center may depend on agent communications.

However, the present format is limited. Currently, an agent is limited in the ways that the agent may contact a customer using communication other than the telephone. For example, when an agent contacts a customer using the telephone, a predictive dialing system may aid the agent in contacting the customer. The predictive dialing system performs the mechanical tasks of establishing contact with the customer and assigning the call to an available agent. If, however, the agent wishes to contact a customer using data applications, e.g. chat, the agent is unable to initiate contact with the customer without first having the customer contact the agent. For example, a customer may send an email to the agent requesting that the agent chat via the Internet with the customer at 1:00 pm. After the initial email communication, the agent may then be able to set up an Internet chat communication at 1:00 pm. For communicating with many customers, the current format is inefficient and ineffective. The current format requires the agent to spend more time trying to establish contact with a customer than actually communicating with the customer using a data application. Accordingly, a need exists for a system and method for predictive customer contacts.

SUMMARY

Under one embodiment of the invention, disclosed is a method for distributing customer contacts to a transaction processing entity of a transaction processing system. The method includes predicting a time for assignment of a customer contact to at least one transaction processing entity in the transaction processing system. In an alternative embodiment, the method also includes finding a transaction processing entity to handle the customer contact and routing the customer contact to the found transaction processing entity.

Other embodiments, features, and advantages of the invention will be apparent to one with skill in the art upon examination of the following figure and detailed description. It is intended that all such additional embodiments, features, and advantages be included within this description, be within the scope of the invention, and be protected by the accompanying claims.

BRIEF DESCRIPTION OF THE FIGURE

The components in the figure are not necessarily to scale, emphasis instead being placed upon illustrating the principles of the invention. In the figure, like reference numerals designate corresponding parts throughout the different views.

DETAILED DESCRIPTION

Figure 1:
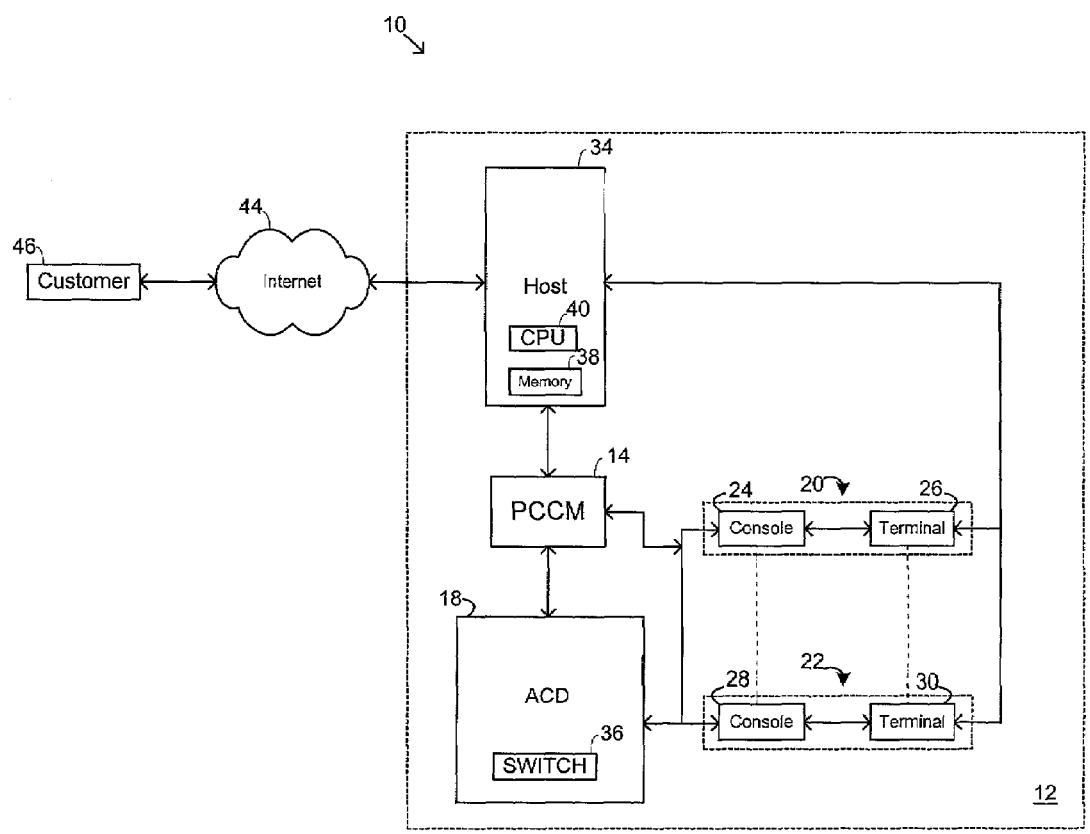
FIG. 1 illustrates a block diagram of a transaction processing system in accordance with an embodiment of the invention.

FIG. 1 depicts a block diagram of an exemplary embodiment of a transaction processing system 10 which may be used to route customer contacts across multiple access channels to a customer contact center 12. The customer contact center 12 may be defined as a communication technology that enables customers and agents of an enterprise to communicate across multiple access channels, including but not limited to telephone, Internet, radio, cellular, satellite, cable, facsimile, email, web and video. As shown in FIG. 1, the customer contact center 12 may be described with reference to an automatic call distributor (ACD) 18. As is known in the art, a PBX, Centrex system or other system capable of incoming and/or outgoing communications may also be used in place of the ACD 18. Implementing a customer contact center 12 with any suitable switching system is considered to be equivalent and variations will not be further discussed. In addition, the customer contact center 12 is also often identified by other terms including call center, connected call center, customer care center, customer communications center and services center.

As used herein, a customer contact may be based on any suitable communications connection including, but not limited to, a switched circuit connection (i.e., through a public switched telephone network (PSTN)) or a packet data connection (e.g., through the Internet). A switched circuit connection (also sometimes referred to simply as a "telephone connection" in the telephony arts) refers to a dedicated channel existing between two parties. As used herein, a packet data connection does not necessarily represent a physical connection, but may simply be the possession and concurrent use by two users of the other user's identifier (e.g. IP address).

In the illustrated embodiment, customer contacts may be received from a customer 46 and may be routed to a selected transaction processing entity (e.g., agent stations 20, 22, or interactive voice response unit (not shown)) of the transaction processing system 10. Further, customer contacts with customer 46 may be established and initiated by the customer contact center 12. In either case, customer contacts may be placed through the ACD 18 and may be routed by matrix switch 36 of the ACD 18 to a console 24, 28 or terminal 26, 30 of the agent station 20, 22. Customer contacts through the Internet 44 may occur as a data application, e.g. email, instant message, chat session, file transfer, and teleconference. Further, the customer contacts may include voice over IP (VOIP) telephony calls.

In an illustrative embodiment, a predictive customer contact manager (PCCM) 14 performs the function of predicting the distribution of customer contacts to agent stations 20, 22. For example, to perform customer contact campaigns, customer lists may be maintained in a database of the host 34. The CPU 40 of the host 34 may initiate customer contacts to a customer 46 on a customer list maintained in a database of the host 34 by establishing Internet 44 communication between the customer contact center 12 and the customer 46. In an illustrative embodiment, the PCCM 14 receives customer 46 information, including contact data, from the host 34 and establishes contact with the customer 46. The contact data may include an email address, a chat room identifier, a telephone number, best-time-to contact information, discussion group name, and an IP address. For example, a customer list for baseball enthusiasts may contain a discussion group name and email addresses which the PCCM 14 may use to establish a chat session with specific baseball enthusiasts at a specific discussion group after the Chicago White Sox and Cubs play a baseball game. Specifically, knowing the discussion group name and email address of a chat user allows the customer contact center 12 to establish a packet data connection between the customer contact center 12 and the customer 46.

In an illustrative embodiment, a software function entitled "MakeMediaCall" is utilized to establish communication with a customer using the Internet 44. MakeMediaCall may execute on the host 34, the PCCM 14, or the ACD 18. In an illustrative embodiment, MakeMediaCall executes on the host 34 and provides the interface between the Internet 44 and the PCCM 14. Further, the host 34 serves as an interface to transfer data between the Internet 44 and the customer contact center 12. Specifically, MakeMediaCall connects to a data application server, e.g. a web server, an email server, a FTP server, etc. on an appropriate port and enters an IP address or domain name to establish a connection to the customer 46.

The host 34 receives information from the Internet 44 indicating whether the connection to the customer 46 is unavailable or "live." The host 34 in turn provides the status information to the PCCM 14. If the PCCM 14 is notified of a live customer contact, the customer contact may be routed to a transaction processing entity (e.g., agent stations 20, 22) based upon customer contact associated information (e.g., the IP address of the customer 46). Customer contact associated information may be used by the CPU 40 as a means of routing the customer contact. As used herein, customer contact associated information may include IP address, ANI, DNIS, call duration, call disconnect, email address, credit card information, items in a shopping basket, caller entered digits, holding time, average speed of answer, handling time, inter and local exchange carriers of the call, response time, and wrap-up codes.

If the customer 46 is an existing customer, the host 34 may identify the customer in its database using the customer contact associated information. If the customer 46 is not an existing customer, then the host 34 may route the customer contact based upon the context (e.g., an identity of a website visited, a webpage from which a query originates, an identity of the e-mail address within the system 10 which receives a query, etc.). Further, customer contacts may be routed based upon any of a number of predetermined criteria (e.g., the number called, the identity of the customer, the local of the customer, the time of day, etc).

In addition, the PCCM 14 retrieves information regarding the customer contact center 12 from the ACD 18. For example, information such as the number of agents who are logged in, the identity of the agents logged in, etc. is downloaded to the PCCM 14 from the ACD 18. If the PCCM 14 is notified of a live customer contact, the PCCM 14 determines whether an agent is available by retrieving information from the ACD 18 regarding whether the agent is logged on, is not currently engaged in a customer contact, and has set the agent status to available. If two or more agents are available, the customer contact may be assigned to the agent who has been available for the longest time.

Having selected an agent, the PCCM 14 provides control codes to the ACD 18 indicating the agent station 20, 22 to which the customer contact will be transferred. These control codes are provided to a control input port of the ACD 18, so that the ACD 18 may transfer the customer contact to the appropriate agent station 20, 22. The ACD 18 may provide a signal to the agent station 20, 22 indicating that the transfer of a live customer contact may follow immediately. This prepares the agent to respond to the customer 46 as though the agent has heard it. Where the customer contact is an email message, the email message may be forwarded in its entirety to the selected agent. Where the customer contact is in the form of a web telephony session, the host 34 may, for example, forward the IP address of the requester to the selected agent. Where the host 34 is able to identify customer records, those records may be presented to the agent along with the email, web telephony request or Internet query.

While the customer contact is being transferred to the agent station, the host 34 may simultaneously transfer data records to the agent's station 20, 22. The agent station 20, 22 may display basic customer information (e.g., email identifier) which allows the agent to establish the identity of the customer before proceeding further with the customer contact. After providing the customer's identity, the terminal of the agent station may display more detailed information for processing the customer contact and may provide input fields into which the agent can enter responses to predetermined questions.

In distributing customer contacts to transaction processing entities, a predictive scheduling method may be utilized. Predictive scheduling may result in utilizing the customer contact center 12 more efficiently. The goal of scheduling is to maximize the time that an agent spends engaged in customer contact communication and to minimize the frequency with which a live customer contact is established when no agent available to attend to the communication. Unattended customer contacts may be placed in a queue, so that agents are assigned to the queue on a first-in, first-out (FIFO) basis as an agent become available.

In operation, a system administrator of the customer contact center 12 may select initial operating parameters for predictive scheduling. The two main parameters that are used as to measure the quality of service are 1) the time a customer must wait for an agent after the transaction processing system establishes connection and 2) the percentage of time that each agent spends engaged in communication with customers. It is desirable to minimize the maximum time that a customer must wait while maximizing the number of agents that are attending to customers at any given time. These goals, however, are conflicting. If the queue of waiting customer contacts is empty then agents are likely to be idle while if agents are being fully utilized, it is likely that customers are spending excessive amounts of time waiting for an agent to become available. To be effective, the aim of predictive scheduling is to achieve a balance between these two competing goals.

In an illustrative embodiment, the PCCM 14 may perform predictive scheduling of customer contacts in a customer contact center 12. In doing so, the PCCM 14 may require that a system administrator of the customer contact center 12 enter initial estimates for the average connecting time and the average time spent by an agent per customer contact. Typically, the average connecting time includes actual time spent establishing the connection by the host 34 or the PCCM 14 plus the time spent waiting for the customer 46 to answer. Failed customer contacts (e.g. unavailable) may be included in the average. The average time spent by the agent per customer contact may include a brief period between customer contacts known as "wrap up," during which the agent is not available to answer additional customer contacts. During this period, the agent may take a short break or may finish any data entry associated with the last customer contact. These estimates may initially be provided using modeling data or estimates based on results from other installations.

Further, the PCCM 14 may require that the system administrator determine the number of agents currently available to receive customer contacts and the number of customer contacts that can be initiated by the customer contact center 12. Based upon these determinations, an initial average queue waiting time is computed. From this information, the PCCM 14 may perform automatic calculations to determine when a new customer contact may be initiated. For example, whenever a customer 46 has answered a customer contact, an agent has began or has completed a communication, the number of active agents or the number of customer contacts has changed, the PCCM 14 recalculates the parameters for average connecting time and the average time a customer waits for an agent after answering.

Further, the PCCM 14 may employ predictive scheduling which is based upon a time homogeneous Markov process, also known as a birth and death process. To form a prediction of when to assign a customer contract to an agent, the model defines the behavior of the customer contact center 12 in terms of its current state without regard to the details of its history at each previous point in time. The birth and death process is described in detail in a textbook by H. M. Wagner entitled Principles of Operations Research, Prentice Hall, 1969, pp 869–875, which is hereby incorporated by reference. The general steady-state behavior of the homogeneous Markov process is described by equations (1) and (2):

$$L(n-1) * P(n-1) = [L(n) + M(n)] * P(n) - M(n+1) * P(n+1) \text{ for } n >= 1 \quad \text{Equation 1}$$

$$L(n) * P(n) = M(n+1) * P(n+1) \text{ for } n = 0 \quad \text{Equation 2}$$

where n=the number of customer contacts in the queue
L(n)=the arrival rate with n customer contacts in the queue
M(n)=the departure rate with n customer contacts in the queue
P(n)=the probability that n customer contacts are in queue Assuming that live customer contacts, i.e. those that are answered by customers, enter the queue according to a Poisson process, L defines a constant input rate for all values of n. Agents become available and respond to live customer contacts according to an exponential distribution, M. There are a limited number of agents, S, and a limit N on the number of customer contacts in queue. Thus, the maximum number of attended plus unattended customer contacts at any time is given by (S+N). The equations (3), (4) and (5) define the probabilities of having a given number of customer contacts in the customer contact center 12.

$$L * P(n) = M * P(n+1) \text{ for } n = 0 \quad \text{Equation 3}$$

$$L * P(n-1) = (L + M) * P(n) - M * P(n+1) \quad \text{Equation 4}$$
$$\text{for } 0 < n < S + N$$

$$L * P(n-1) = M * P(n) \text{ for } n = S + N \quad \text{Equation 5}$$

From these equations, equations (6), (7) and (8) can be derived which define the probability of having n customer contacts in the customer contact center 12 which includes customer contacts in the queue and being handled by agents.

$$p(0) = 1 \bigg/ \bigg[ \sum_{n=0}^{S} (R^n/n!) + R^{S+1}/(S*S!) * (1 - RN/SN)/(1 - R/S) \bigg] \quad \text{Equation 6}$$

$$P(n) = R^n * P(0)/n! \text{ for } n <= S \quad \text{Equation 7}$$

$$P(n) = R^n * P(0)/(S! * S^{(n-S)}) \text{ for } S < n <= S + N \quad \text{Equation 8}$$

where R=L/M.

Next a half interval technique for selecting a value for N (the maximum number of customer contacts in the queue) is utilized. Initial ranges are determined for N, setting the minimum value at 1 and the maximum value at twice the number of agents. The initial value of N is set equal to the midpoint of the range. This value and the process values are applied to the above equations to determine the probability density function, P, for the number of customer contacts in the customer contact center 12, the probability, P(0), that the customer contact center 12 is empty and the probability, P(N+S), that the customer contact center 12 is full. From these probability values, the expected queue wait time, the expected number of customer contacts, the expected queue length, the expected number of busy agents, and the expected number of customer contacts served may be calculated.

Using these expected values, the range for N is reduced by half to converge on the N value which satisfies the minimum agent busy-time constraint. If the expected number of busy agents is greater than the target value, then the range for the number N (the maximum number of customer contacts in the queue) may be decreased, so that the new range maximum is set to the old midpoint. If the target number of busy agents was not met, then the range for N is increased so that there is a larger pool of customer contacts available for the idle agents and the new range minimum is set to the old midpoint. If the required average number of busy agents is met exactly, then the final minimum value for N is established. This value represents the smallest maximum queue size that meets the agent busy time requirement.

Next, a second range reduction process is performed to converge on the maximum queue size which complies with the allowable queue waiting time constraint. Given a constant number of agents, the expected queue waiting time over the interval is directly proportional to the number of customer contacts in the queue. Consequently, the expected queue waiting time is equal to the number of customer contacts in the queue. This process is essentially the same as the process outlined for calculating the N value which satisfies the agent busy time constraint except that, during each iteration, if the expected maximum queue delay exceeds the preset maximum queue delay, the new range maximum is set to the old midpoint and if the expected maximum queue delay is less than the preset maximum delay value, the new range minimum is set to the old midpoint. If the expected waiting time matches the maximum waiting time then the final maximum value for N is established.

If the expected waiting time does not match the maximum waiting time then range reduction is repeated until the difference between the maximum queue waiting time and the minimum queue waiting time is unity. The maximum queue length is set to the average of the minimum and maximum queue waiting times. This maximum queue length represents a queue length at which the expected queue delay equals the desired maximum queue delay. Using these calculated values, the range for N is reduced to converge upon the N value which satisfies the desired expected # of busy agents. Range reduction is repeated until the difference between the minimum number of busy agents and the maximum number of busy agents is unity. The final value for N is set to the average of the final minimum value and the final maximum value. This value represents a desired queue length which makes a compromise between the maximum wait in the queue and the minimum number of busy agents.

The PCCM 14 counts the current number of unattended customer contacts in the queue and compares the current number of unattended customer contacts in the queue to the newly updated desired value of N. If the actual value is less than the desired value, more customer contacts are established. If the actual value exceeds that desired number of customer contacts, then the predictive customer contact system does not attempt to establish any further customer contacts until a new value for N has been calculated. By using predictive scheduling the PCCM 14 determines when to attempt to establish customer contacts so that an agent may be available to handle the customer contact.

In an alternative embodiment, contextual information regarding the customer contact is employed to enhance predictive scheduling of customer contacts. For example, where the customer contact is a data application, e.g. chat, that is delivered to the agent terminal 26, 30, the chat session may be carried on a data channel of ACD 18. Contextual information may be extracted so as to determine whether the chat session may soon end. For example, contextual information such as "bye" or "adios" signal the PCCM 14 regarding the end of a conversation even before the communication session is disconnected. Contextual information may include message length, session time, email content, and shopping cart items.

While various embodiments of the invention have been described, it will be apparent to those of ordinary skill in the art that many more embodiments and implementations are possible that are within the scope of this invention.

What is claimed is:

1. A method at least partially based upon use of the Internet for distributing customer contacts to a plurality of transaction processing entities of a transaction processing system, such method comprising:

providing a plurality of data applications for communicating through the Internet where each data application of the plurality of data applications operates under a different Internet format;

predicting a time for assignment of at least one customer contact to at least one transaction processing entity of the plurality of transaction processing entities in the transaction processing system;

using the Internet to set up the at least one customer contact using one of the plurality of data applications based upon the predicted time determining that the at least one customer contact is one of the group consisting of a live customer contact and a contact with an unavailable customer;

when the customer contact is a live customer contact, assigning the customer contact to a transaction processing entity of the plurality of transaction processing entities based upon contact associated information; and when the customer contact is a contact with an unavailable customer, assigning the customer contact to a queue so that transaction processing entities are assigned to the queue on a first-in, first-out basis as a transaction processing entity of the plurality of transaction processing entities become available.

2. The method of claim 1 wherein predicting further comprises modeling the transaction processing system as a time homogeneous Markov process of customer contacts entering and leaving the transaction processing system so that the assignment of a customer contact occurs when the at least one transaction processing entity is available to process the customer contact.

3. The method of claim 1 wherein the customer contact comprises at least one of chat session, telephone call, cellular call, radio call, satellite call, cable connection, facsimile, email, web session, instant message, Internet data application, voice over Internet Protocol call, and teleconference.

4. The method of claim 1 wherein the transaction processing system comprises a database of customer contact data wherein the data comprises at least one of email address, a chat room identifier, a telephone number, best time to contact information, discussion group name, and IP address.

5. The method of claim 1 wherein the transaction processing entity comprises a host computer for interfacing between the customer and the at least one transaction processing entity.

6. The method of claim 5 wherein the host computer interfaces to a data application server.

7. The method of claim 1 wherein the transaction processing entity comprises at least one of an agent, an agent station, a console, a terminal, and an interactive voice response unit.

8. The method of claim 1 wherein predicting further comprises utilizing contextual information to determine whether when a customer contact communication may end.

9. A method at least partially based upon use of the Internet for distributing customer contacts to a plurality of transaction processing entities of a transaction processing system, such method comprising:
providing a plurality of data applications for communicating through the Internet where each data application of the plurality of data applications operates under a different Internet format;
predicting a time for assignment of at least one customer contact to at least one transaction processing entity of the plurality of transaction processing entities in the transaction processing system;
setting up the customer contact through the Internet using one of the plurality of data applications;
determining that the customer contact is one of the group consisting of a live customer contact and a contact with an unavailable customer;
when the customer contact is a live customer contact, finding the at least one transaction processing entity to process the customer contact;
routing the at least one customer contact to the found at least one transaction processing entity using one of the plurality of data applications; and
when the customer contact is a contact with an unavailable customer, assigning the customer contact to a queue so that transaction processing entities are assigned to the queue on a first-in, first-out basis as a transaction processing entity of the plurality of transaction processing entities become available.

10. The method of claim 9 wherein predicting further comprises modeling the transaction processing system as a time homogenous Markov process of customer contact entering and leaving the transaction processing system so that the assignment of a customer contact occurs when the at least one transaction processing entity is available to process the customer contact.

11. The method of claim 9 wherein the customer contact comprises at least one of chat session, telephone call, cellular call, radio call, satellite call, cable connection, facsimile, e-mail, web session, instant message, Internet data application, voice over Internet Protocol call, and teleconference.

12. The method of claim 9 wherein the transaction processing system comprises a database of customer contact data wherein the data comprises at least one of e-mail address, a chat room identifier, a telephone number, best time to contact information, discussion group name, and IP address.

13. The method of claim 9 wherein the transaction processing entity comprises a host computer for interfacing between the customer and the at least one transaction processing entity.

14. The method of claim 13 wherein the host computer interfaces to a data application server.

15. The method of claim 13 wherein the host computer interfaces to at least one of least one of a telephone, Internet, radio, cellular, satellite, cable, facsimile, email, web, and video medium.

16. The method of claim 9 wherein the transaction processing entity comprises at least one of an agent, an agent station, a console, a terminal, and an interactive voice response unit.

17. The method of claim 9 wherein predicting further comprises utilizing contextual information to determine whether when a customer contact communication may end.

18. The method of claim 9 wherein finding a transaction processing entity further comprises retrieving agent availability information from an automatic call distributor of the transaction processing system.

19. The method of claim 9 wherein routing further comprises searching a database of customer contacts to determine whether the customer contact is an existing customer of the transaction processing system.

20. The method of claim 9 wherein routing further comprises sending customer contact associated information along with the customer contact to a found at least one transaction processing entity.

21. The method of claim 11 wherein connecting is performed by a matrix switch of an automatic call distributor.

22. A system at least partially based upon use of the Internet for distributing customer contacts to a plurality of transaction processing entities of a transaction processing system comprising:
a plurality of data applications for communicating through the Internet where each data application of the plurality of data applications operates under a different Internet format;
means for predicting a time for assignment of a customer contact to at least one transaction processing entity of the plurality of transaction processing entities in the transaction processing system;
means for setting up the customer contact through the Internet using one of the plurality of data applications;
means for determining that the customer contact is one of the group consisting of a live customer contact and a contact with an unavailable customer;
means for finding the at least one transaction processing entity of the plurality of transaction processing entities to process the customer contact when the customer contact is a live customer contact;
means for routing the customer contact to the found at least one transaction processing entity using one of the plurality of data applications; and
means for assigning the customer contact to a queue when the customer contact is a contact with an unavailable customer so that transaction processing entities are assigned to the queue on a first-in, first-out basis as a transaction processing entity of the plurality of transaction processing entities become available.

23. The system of claim 22 wherein means for predicting further comprises means for modeling the transaction processing system as a time homogeneous Markov process of customer contacts entering and leaving the transaction processing system so that the assignment of a customer contact occurs when the at least one transaction processing entity is available to process the customer contact.

24. The system of claim 22 wherein the customer contact comprises at least one of chat session, telephone call, cellular call, radio call, satellite call, cable connection, facsimile, email, web session, instant message, Internet data application, voice over Internet Protocol call, and teleconference.

25. The system of claim 22 wherein the transaction processing system comprises a database of customer contact data wherein the data comprises at least one of email address, a chat room identifier, a telephone number, best time to contact information, discussion group name, and IP address.

26. The system of claim 22 wherein the transaction processing entity comprises a host computer for interfacing between the customer and the at least one transaction processing entity.

27. The system of claim 26 wherein the host computer interfaces to a data application server.

28. The system of claim 26 wherein the host computer interfaces to at least one of least one of a telephone, Internet, radio, cellular, satellite, cable, facsimile, email, web, and video medium.

29. The system of claim 22 wherein the transaction processing entity comprises at least one of an agent, an agent station, a console, a terminal, and an interactive voice response unit.

30. The system of claim 22 wherein means for predicting further comprises means for utilizing contextual information to determine whether when a customer contact communication may end.

31. The system of claim 22 wherein means for finding a transaction processing entity further comprises means for retrieving agent availability information from an automatic call distributor of the transaction processing system.

32. The system of claim 22 wherein means for routing further comprises means for searching a database of customer contacts to determine whether the customer contact is an existing customer of the transaction processing system.

33. The system of claim 22 wherein means for routing further comprises means for sending customer contact associated information along with the customer contact to a found at least one transaction processing entity.

34. The system of claim 22 wherein means for routing is performed by a matrix switch of an automatic call distributor.

35. A system based upon use of the Internet for distributing a customer contact to one of a plurality of transaction processing entities of a transaction processing system comprising:
  a plurality of data applications for communicating through the Internet where each data application of the plurality of data applications operates under a different Internet format;
  a MakeMediaCall software function that establishes communication with the at least one customer using the Internet;
  means for determining that the customer contact in the contact queue is one of the group consisting of a live customer contact and a contact with an unavailable customer;
  a predictive customer contact manager to distribute the customer contact to a transaction processing entity of the plurality of transaction processing enties, when the customer contact is a live customer and when the transaction processing entity becomes available to process the customer contact;
  a router that connects the customer contact to the available transaction processing entity using one of the plurality of data applications; and
  a queue for contacts with unavailable customers so that transaction processing entities are assigned to the queue on a first-in, first-out basis as a transaction processing entity of the plurality of transaction processing entities become available.

36. The system of claim 35 wherein the predictive customer contact manager models the transaction processing system as a time homogeneous Markov process of customer contacts entering and leaving the transaction processing system.

37. The system of claim 35 wherein the transaction processing entity comprises at least one of an agent, an agent station, a console, a terminal, and an interactive voice response unit.

38. The system of claim 35 wherein the predictive customer contact manager interfaces to a data application server.

39. The system of claim 35 wherein the router comprises a matrix switch of an automatic call distributor.

40. The system of claim 35 wherein the predictive customer contact manager further comprises a contextual analyzer to determine when a customer contact communication may end.

41. The system of claim 35 wherein the predictive customer contact manager interfaces to at least one of telephone, Internet, radio, cellular, satellite, cable, facsimile, email, web, and video.

42. The system of claim 35 wherein the predictive customer contact manager interfaces with an automatic call distributor.

43. The system of claim 42 wherein the automatic call distributor provides agent availability information to the predictive customer contact manager.

44. The system of claim 35 wherein the customer contact comprises at least one of a telephone call, Voice over IP telephone call, chat session, email, instant messaging session, and teleconference.

45. The system of claim 35 further comprising a database of customer contacts that provides the predictive customer contact manager with customer contact data.

* * * * *